(No Model.)
J. CAVANAUGH.
BICYCLE SADDLE.
No. 512,008. Patented Jan. 2, 1894.
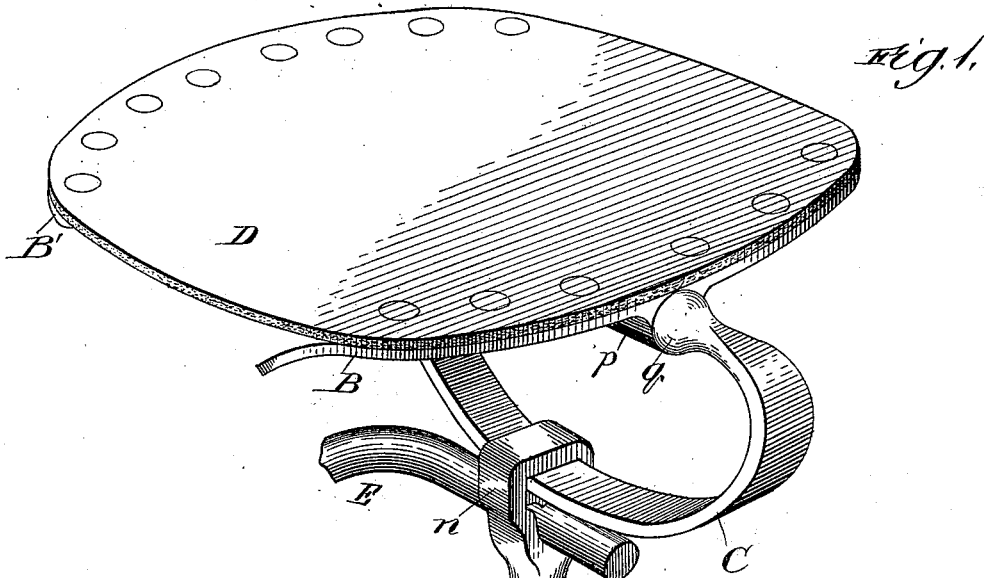
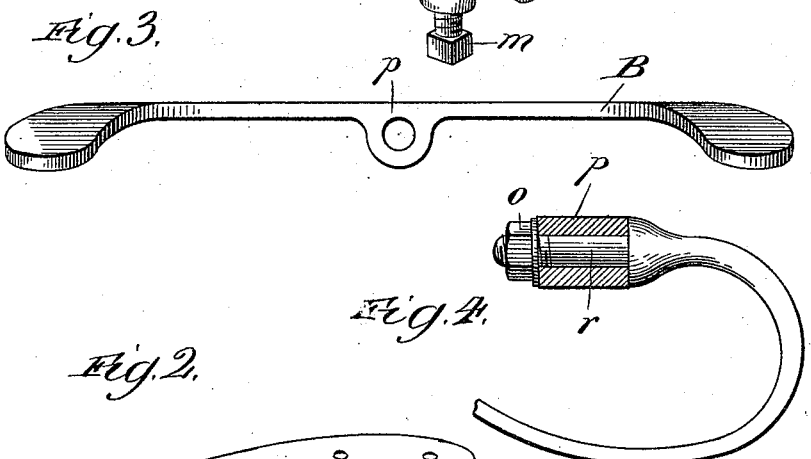
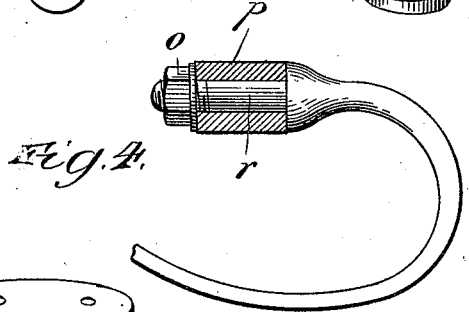
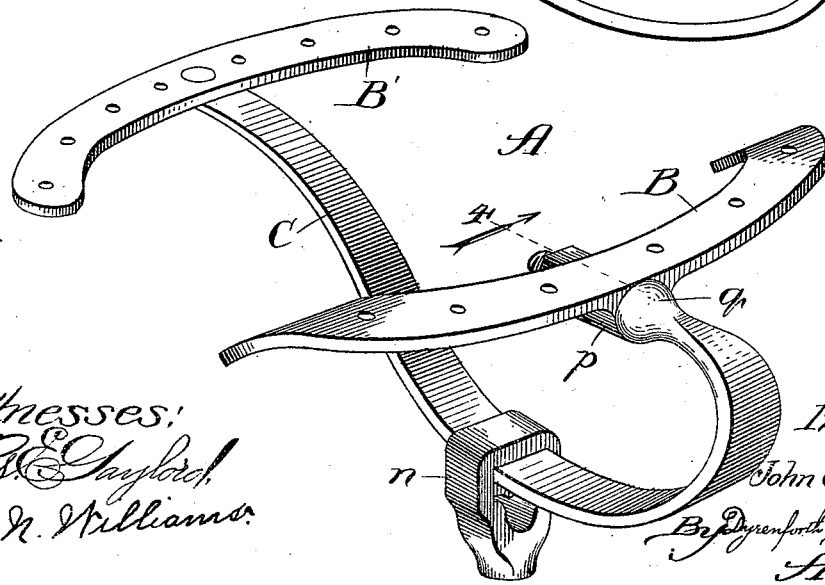
Witnesses:
Chas. E. Gaylord
W. N. Williams
Inventor:
John Cavanaugh,
By Dyrenforth & Dyrenforth,
Attys

UNITED STATES PATENT OFFICE.

JOHN CAVANAUGH, OF EVANSTON, ILLINOIS.

BICYCLE-SADDLE.

SPECIFICATION forming part of Letters Patent No. 512,008, dated January 2, 1894.

Application filed September 26, 1893. Serial No. 486,510. (No model.)

*To all whom it may concern:*

Be it known that I, JOHN CAVANAUGH, a citizen of the United States, residing at Evanston, in the county of Cook and State of Illinois, have invented a new and useful Improvement in Bicycle-Saddles, of which the following is a specification.

My invention relates to an improvement in the variety of bicycle-saddles the construction of which is intended to adapt the saddle to rock in a transverse direction thus to follow the alternate up and down motions of the legs of the rider.

The primary object of my invention is to provide a construction of bicycle-saddle of the foregoing variety the rear portion of which shall be stationary to afford a stable seat to the rider, and the forward portion of which shall be adapted to rock transversely to follow and assist the motions of the legs in riding.

A further object is to provide such construction in connection with a seat which affords at its forward edge a rest against which to bear the rear sides of the legs; and my further object is to provide a generally improved construction of bicycle-saddle.

Referring to the accompanying drawings—Figure 1 shows my improved saddle by a perspective view. Fig. 2 is a similar view showing the uncovered frame of the saddle. Fig. 3 is a front view of the forward bar of the saddle-frame. Fig. 4 is a broken section taken at the line 4 on Fig. 2 and viewed in the direction of the arrow.

A is the saddle-frame comprising a rear bar B', which should be of metal and is preferably of the curved form illustrated; a leaf-spring C fastened at one end to the center of the rear bar in a manner to prevent it from tilting thereon, and terminating at the extremity of the return-bend in its forward end, in a pivot-pin extension $r$ backed by a shoulder $q$; and a front bar B, also preferably of metal and in the curved form illustrated with the ends bent somewhat backward and downward, the bar B being connected with the spring by the pivot-pin $r$ of the latter passing through a transverse perforated boss or bearing $p$ at the center of the bar, and the parts being fastened against separation by a nut $o$ on the protruding end of the pivot-pin.

D is the cover or seat, of some suitably flexible material or materials, preferably leather, fastened at its forward and rear edge-portions respectively to the bars B and B'.

As represented, the saddle is fastened to the rod E of the bicycle by means of a collar $n$ on the spring C, through which the bent end of the rod passes and is secured by a set-screw $m$.

As will be seen, by the construction of my improved saddle, the rider sits firmly on the seat owing to the rigidity of the rear portion due to the stationary bar B', while his legs find comfortable bearing against the forward edge of the saddle at opposite sides of the protruding return-bend portion of the spring, there being no ridge in the forward portion, as in the more common front-tapering form of saddle to injure the rider, but on the contrary the construction affords a seat much like that of a chair. Moreover, as the legs of the rider work up and down in operating the treadles the pivotal construction of the forward portion of the saddle with the flexible seat enable it to rock transversely and thus follow the motions of the legs and, obviously, materially to assist the motion of the rising leg, whereby the exertion in riding is accordingly diminished.

What I claim as new, and desire to secure by Letters Patent, is—

1. A bicycle-saddle having a rigid back and a transversely rocking front, said front affording a backward bearing for the legs of the rider, substantially as described.

2. A bicycle-saddle comprising a frame having a rigid rear bar, a transversely rocking forward bar and a flexible seat connecting the two bars, substantially as described.

3. A bicycle-saddle comprising a frame formed with a spring, a rear bar fastened against transverse rocking to the rear end of the spring and a forward bar pivotally fastened, to rock transversely, to the forward part of the spring, and a flexible seat connecting the two bars, substantially as described.

4. A bicycle-saddle comprising a frame A formed of a spring C terminating at the end of its return-bend in a pivot-pin $r$, a rear bar B' fastened against transverse rocking to the rear end of the spring, and a forward bar B having a transverse bearing $p$ at which it is pivotally fastened on the pin $r$, and a flexible seat D connecting the two bars, substantially as described.

5. A bicycle-saddle comprising a frame A formed of a spring C, a rear forwardly curved bar B' fastened against transverse rocking to the rear end of the spring and a forward backwardly curved bar B pivotally fastened, to rock transversely, to the forward part of the spring and having the downwardly and backwardly curved ends, and a flexible seat D connecting the two bars, substantially as described.

JOHN CAVANAUGH.

In presence of—
M. J. FROST,
W. N. WILLIAMS.